(12) United States Patent
Ungnapatanin (10) Patent No.: US 9,989,413 B1
(45) Date of Patent: Jun. 5, 2018

(54) SPECTROMETER AND SPECTROMETER MODULE

(71) Applicant: SAMSUNG ELECTRONICS CO., LTD., Suwon-si (KR)

(72) Inventor: Jesada Ungnapatanin, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days. days.

(21) Appl. No.: 15/442,851

(22) Filed: Feb. 27, 2017

(30) Foreign Application Priority Data

Nov. 18, 2016 (KR) .................. 10-2016-0154355

(51) Int. Cl.
*G01N 21/25* (2006.01)
*G01J 3/12* (2006.01)
*G01J 3/26* (2006.01)
*G02F 1/133* (2006.01)
*G02F 1/139* (2006.01)
*G01J 3/28* (2006.01)

(52) U.S. Cl.
CPC . *G01J 3/12* (2013.01); *G01J 3/26* (2013.01); *G01J 3/28* (2013.01); *G02F 1/139* (2013.01); *G02F 1/13306* (2013.01); *G01J 2003/1269* (2013.01)

(58) Field of Classification Search
CPC ........ G01J 3/42; G01J 3/12; G01J 3/26; G01J 3/28; G02F 1/13306; G02F 1/216; G02F 2203/055; G02B 5/3016; G01N 21/359; G01N 21/65

See application file for complete search history.

(56) References Cited

U.S. PATENT DOCUMENTS

| | | | | |
|---|---|---|---|---|
| 5,150,236 A | * | 9/1992 | Patel | G02F 1/216 349/114 |
| 5,272,554 A | * | 12/1993 | Ji | G02F 1/135 349/27 |
| 5,311,021 A | * | 5/1994 | Messerschmidt | G01N 21/255 250/339.07 |

(Continued)

FOREIGN PATENT DOCUMENTS

| | | |
|---|---|---|
| EP | 1646841 | 2/2005 |
| KR | 10-2015-0136977 A | 12/2015 |

(Continued)

OTHER PUBLICATIONS

Tien-Hsin Chao et al., "Compact Liquid Crystal Waveguide Based Fourier Transform Spectrometer for In-Situ and Remote Gas and Chemical Sensing", 2009 International Conference on Optical Instruments and Technology: Advanced Sensor Technologies and Applications, edited by Yanbiao Liao, Anbo Wang, Tingyun Wang, Yukihiro Ishii, Proc. of SPIE vol. 7508, 2009 SPIE, pp. 75080K-1-75080K-11. doi: 10.1117/12.838260.

(Continued)

*Primary Examiner* — Dominic J Bologna
*Assistant Examiner* — Maurice Smith
(74) *Attorney, Agent, or Firm* — Sughrue Mion, PLLC (57) ABSTRACT

A spectrometer and a spectrometer module are disclosed. The spectrometer includes a liquid crystal (LC) filter including an LC layer configured to pass light having a wavelength that is tunable based on an electrical stimulus that is applied to the LC layer, and a photodetector configured to detect the light passed through the LC filter.

10 Claims, 10 Drawing Sheets

(56) References Cited

U.S. PATENT DOCUMENTS

| | | |
|---|---|---|
| 8,421,956 B2 | 4/2013 | Lee et al. |
| 8,854,624 B2 | 10/2014 | Pervez et al. |
| 9,234,797 B1 | 1/2016 | Newman et al. |
| 2005/0030657 A1 | 2/2005 | Maier et al. |
| 2006/0001870 A1* | 1/2006 | Voigt .................. G01J 3/12 356/301 |
| 2006/0203238 A1* | 9/2006 | Gardner, Jr. ............ G01J 3/02 356/301 |
| 2011/0174977 A1* | 7/2011 | Hikmet .................. G01J 3/02 250/331 |
| 2011/0228279 A1 | 9/2011 | Lucey |
| 2012/0268709 A1* | 10/2012 | Zilkie .................. G02F 1/216 349/198 |
| 2015/0354789 A1* | 12/2015 | Paolini ................ F21V 14/003 349/16 |
| 2016/0061660 A1 | 3/2016 | Kim |
| 2016/0127660 A1 | 5/2016 | Hegyi et al. |

FOREIGN PATENT DOCUMENTS

| | | |
|---|---|---|
| KR | 10-2016-0024608 A | 3/2016 |
| WO | 2005/010474 A2 | 2/2005 |

OTHER PUBLICATIONS

Yuko Matsuhisa et al., Cholesteric liquid crystal laser in a dielectric mirror cavity upon band-edge excitation, Optics Express 616, Jan. 2007, vol. 15, No. 2, (7 Pages Total).

Alex Hegyi et al., "Hyperspectral imaging with a liquid crystal polarization interferometer", Optics Express 28742, vol. 23, No. 22, Nov. 2, 2015, (13 Pages Total) DOI:10.1364/OE.23.028742.

* cited by examiner

SPECTROMETER AND SPECTROMETER MODULE

CROSS-REFERENCE TO RELATED APPLICATION

This application claims priority from Korean Patent Application No. 10-2016-0154355, filed on Nov. 18, 2016, in the Korean Intellectual Property Office, the disclosure of which is incorporated herein by reference in its entirety.

BACKGROUND

1. Field

Apparatuses and methods consistent with example embodiments relate to a spectrometer and a spectrometer module.

2. Description of Related Art

Currently the most discussed method for non-invasively measuring a blood sugar level is an optical method. Near-infrared (NIR) absorption spectroscopy and Raman spectroscopy are the most promising optical techniques for non-invasively measuring a blood sugar level. The NIR absorption spectroscopy is a method of analyzing light that is emitted out of the skin through diffused reflection after irradiating broadband NIR rays on the skin to calculate the intensity of light absorbed by blood sugar molecules in the skin and to predict a blood sugar level. The Raman spectroscopy is a method of analyzing a blood sugar level by obtaining a Raman shift via an analysis on wavelengths of light emitted from the skin after irradiating a laser beam on the skin.

A bulky grating or Michelson interferometer is used to analyze a spectrum of light. Thus, a considerable space is used in the spectrometer, and due to such a volume characteristic of the spectrometer, there are many restrictions in manufacturing a miniature non-invasive blood sugar sensor.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

According to an aspect of an example embodiment, there is provided a spectrometer including a liquid crystal (LC) filter including an LC layer configured to pass light having a wavelength that is tunable based on an electrical stimulus that is applied to the LC layer, and a photodetector configured to detect the light passed through the LC filter.

The LC filter may further include a first dielectric mirror and a second dielectric mirror, and the LC layer may be interposed between the first dielectric mirror and the second dielectric mirror.

Each of the first dielectric mirror and the second dielectric mirror may have a laminated structure in which inorganic layers having different refractive indices are alternately stacked on each other.

The LC filter may further include a first electrode and a second electrode, the first electrode may be interposed between the first dielectric mirror and the LC layer, and the second electrode may be interposed between the LC layer and the second dielectric mirror.

The spectrometer may further include a spectrum scanner configured to apply the electrical stimulus to the LC layer.

The spectrometer may further include a spectrum generator configured to measure intensities of the detected light of different wavelengths, and generate a spectrum, based on the measured intensities of the detected light.

According to an aspect of another example embodiment, there is provided a spectrometer liquid crystal (LC) filters, each of the LC filters including an LC layer configured to pass light having a wavelength that is tunable based on an electrical stimulus that is applied to the LC layer, and a photodetector configured to detect the light passed through the LC filters.

The LC filters may have different thicknesses.

According to an aspect of another example embodiment, there is provided a spectrometer module including a light source configured to irradiate light onto an object, a spectrometer configured to receive scattered light from the object onto which the light is irradiated, and measure a spectrum, based on the received scattered light, and a processor configured to analyze physical properties of the object, based on the measured spectrum. The spectrometer may include a liquid crystal (LC) filter including an LC layer configured to pass light having a wavelength that is tunable based on an electrical stimulus that is applied to the LC layer, and a photodetector configured to detect the light passed through the LC filter.

The LC filter may further include a first dielectric mirror and a second dielectric mirror, and the LC layer may be interposed between the first dielectric mirror and the second dielectric mirror.

Each of the first dielectric mirror and the second dielectric mirror may have a laminated structure in which inorganic layers having different refractive indices are alternately stacked on each other.

The LC filter may further include a first electrode and a second electrode, the first electrode may be interposed between the first dielectric mirror and the LC layer, and the second electrode may be interposed between the LC layer and the second dielectric mirror.

The processor may be further configured to analyze the physical properties of the object, using near-infrared (NIR) absorption spectroscopy or Raman spectroscopy.

The spectrometer may be further configured to receive the scattered light that is reflected from the object onto which the light is irradiated.

The spectrometer may be further configured to receive the scattered light that is transmitted through the object onto which the light is irradiated.

BRIEF DESCRIPTION OF THE DRAWINGS

The above and/or other aspects will be more apparent by describing example embodiments with reference to the accompanying drawings.

DETAILED DESCRIPTION

The following detailed description is provided to assist the reader in gaining a comprehensive understanding of the methods, apparatuses and/or systems described herein. Various changes, modifications, and equivalents of the systems, apparatuses and/or methods described herein will suggest themselves to those of ordinary skill in the art. In the following description, a detailed description of known functions and configurations incorporated herein will be omitted when it may obscure the subject matter with unnecessary detail.

In some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

Terms described in below are selected by considering functions in example embodiments and meanings may vary depending on, for example, a user or operator's intentions or customs. Therefore, in the following example embodiments, when terms are specifically defined, the meanings of terms may be interpreted based on definitions, and otherwise, may be interpreted based on general meanings recognized by those skilled in the art.

As used herein, the singular forms are intended to include the plural forms as well, unless the context clearly indicates otherwise. It will be further understood that the terms "comprises" and/or "comprising," or "includes" and/or "including" when used in this description, specify the presence of stated features, numbers, steps, operations, elements, components or combinations thereof, but do not preclude the presence or addition of one or more other features, numbers, steps, operations, elements, components or combinations thereof.

Figure 1:
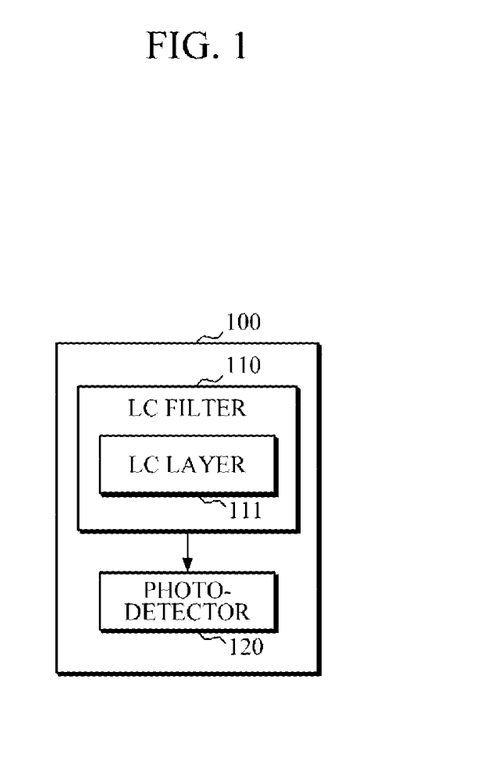
FIG. 1 is a block diagram illustrating a spectrometer according to an example embodiment.

FIG. 1 is a block diagram illustrating a spectrometer 100 according to an example embodiment.

Referring to FIG. 1, the spectrometer 100 includes a liquid crystal (LC) filter 110 and a photodetector 120.

The pass wavelength of the LC filter 110 may be tunable according to an electrical stimulus. For example, the pass wavelength of the LC filter 110 may increase with an increase in the voltage applied to the LC filter 110 or decrease with an increase in the voltage applied to the LC filter 110, according to the arrangement of LC molecules. To this end, the LC filter 110 includes a LC layer 111 whose pass wavelength is tunable according to the electrical stimulus.

The LC layer 111 may include a plurality of LC molecules. The LC molecules may be twisted or loosened according to a change in the voltage applied to the LC layer 111. Accordingly, the effective refractive index of the LC layer 111 may be changed, and thereby, the pass wavelength of the LC layer 111 may be changed.

The photodetector 120 may detect light filtered through the LC filter 110 and convert the light into an electrical signal. According to an example embodiment, the photodetector 120 may be implemented by a single element, such as a photo diode, a charge-coupled device (CCD), or a complementary metal-oxide semiconductor, and may be formed as an array of these elements.

Figure 2:
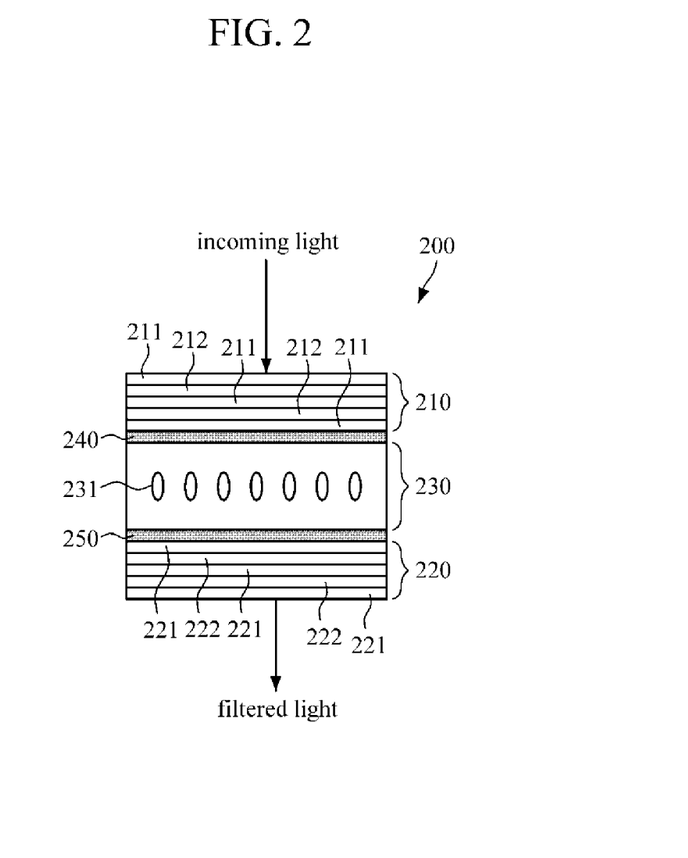
FIG. 2 is a diagram illustrating a liquid crystal (LC) filter according to an example embodiment.

FIG. 2 is a diagram illustrating an LC filter 200 according to an example embodiment. The LC filter 200 of FIG. 2 may be an example embodiment of the LC filter 110 of FIG. 1.

Referring to FIG. 2, the LC filter 200 includes a first dielectric mirror 210, a second dielectric mirror 220, a LC layer 230, a first electrode 240, and a second electrode 250.

The first dielectric mirror 210 has a structure in which a first inorganic layer 211 and a second inorganic layer 212 are alternately stacked atop each other. For example, in the first dielectric mirror 210, the first inorganic layer 211 and the second inorganic layer 212 may be stacked on each other at least once. In FIG. 2, the first dielectric mirror 210 has a 5-layer laminated structure in which the first inorganic layer 211, the second inorganic layer 212, the first inorganic layer 211, the second inorganic layer 212, and the first inorganic layer 211 are stacked in this order.

According to an example embodiment, the first inorganic layer 211 and the second inorganic layer 212 may be formed of different materials having different refractive indices. In this case, the refractive index of the first inorganic layer 211 may be smaller than that of the second inorganic layer 212, or conversely, the refractive index of the first inorganic layer 211 may be greater than that of the second inorganic layer 212. For example, the first inorganic layer 211 may be formed of SiN or $TiO_2$, and the second inorganic layer 212 may be formed of $SiO_2$.

Similarly to the first dielectric mirror 210, the second dielectric mirror 220 has a laminated structure in which a third inorganic layer 221 and a fourth inorganic layer 222 are alternately stacked atop each other. For example, in the second dielectric mirror 220, the third inorganic layer 221 and the fourth inorganic layer 222 may be stacked on each other at least once.

According to an example embodiment, the third inorganic layer 221 and the fourth inorganic layer 222 may be formed of different materials with different refractive indices. For example, the third inorganic layer 221 may be formed of SiN or $TiO_2$, and the fourth inorganic layer 222 may be formed of $SiO_2$.

In FIG. 2, it is illustrated that both of the first dielectric mirror 210 and the second dielectric mirror 220 have a five-layer laminated structure with the same thickness, but it is an example embodiment. That is, the first dielectric mirror 210 and the second dielectric mirror 220 may have different layers. In addition, each layer in each of the first and second dielectric mirrors 210 and 220 may be formed with a different thickness, and as a result, the first dielectric mirror 210 and the second dielectric mirror 220 may have different thicknesses.

The first dielectric mirror 210 and the second dielectric mirror 220 have the structure in which two layers with different refractive indices are repeatedly stacked, so that light incident into the first dielectric mirror 210 or the second dielectric mirror 220 is accumulated as it passes through the structure with the different refractive indices and the accumulated light can be radiated at once. Accordingly, the total amount of light radiated may be amplified, and thereby the light efficiency of the LC filter 200 may be enhanced.

The first electrode 240 may be interposed between the first dielectric mirror 210 and the LC layer 230, and the second electrode 250 may be interposed between the LC layer 230 and the second dielectric mirror 220. The first electrode 240 and the second electrode 250 may be formed of a transparent conductive material, such as indium tin oxide (ITO) or indium zinc oxide (IZO) to not affect the propagation of light.

The LC layer 230 may be interposed between the first dielectric mirror 210 and the second dielectric mirror 220, and the pass wavelength thereof may be tunable according to the voltage applied to the first electrode 240 and the second electrode 250. The LC layer 230 includes a plurality of LC molecules 231. The LC molecules 231 may be twisted or loosened according to a change in the voltage applied to the LC layer 230, and accordingly, the effective refractive index of the LC layer 230 may be changed. As a result, the pass wavelength of the LC layer 230 may be changed.

The process of filtering incoming light through the LC filter 200 is as below.

The amount of the incoming light is amplified by the first dielectric mirror 210. Among the incoming light whose amount is amplified, only the light of a pass wavelength determined according to the magnitude of voltage applied to the electrodes 240 and 250 passes through the LC layer 230. The light of the specific wavelength that has passed through the LC layer 230 is amplified by the second dielectric mirror 220 and output as filtered light.

Figure 3:
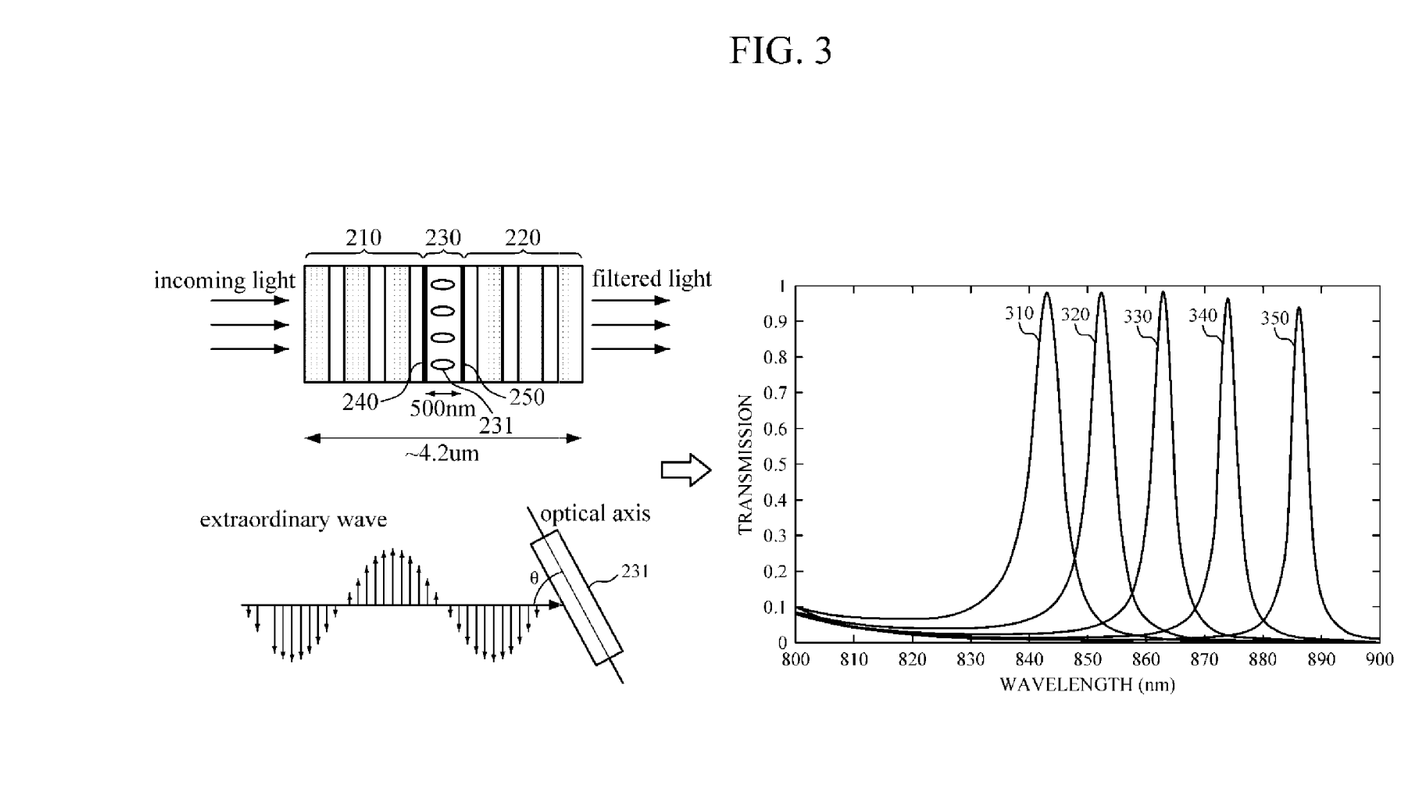
FIG. 3 is a diagram illustrating a pass wavelength being changed according to an electrical stimulus, according to an example embodiment.

FIG. 3 is a diagram illustrating a pass wavelength being changed according to an electrical stimulus, according to an example embodiment.

FIG. 3 shows the intensity of the light filtered by an LC filter 200 according to an angle formed by the propagation direction of the light and the orientation of LC molecules 231 in a case in which a first dielectric mirror and a second dielectric mirror each have a 6-layer laminated structured in which one layer formed of SiN and another layer formed of $SiO_2$ are repeatedly stacked on each other, the thickness of an LC layer is 500 nm, and the LC filter has a thickness of 4.2 μm. More specifically, reference numeral 310 denotes the intensity of the filtered light when an angle formed by the propagation direction of the light and the orientation of the LC molecules 231 is 0°, reference numeral 320 denotes the intensity of the filtered light when an angle formed by the propagation direction of the light and the orientation of the LC molecules 231 is 30°, reference numeral 330 denotes the intensity of the filtered light when an angle formed by the propagation direction of the light and the orientation of the LC molecules 231 is 45°, reference numeral 340 denotes the intensity of the filtered light when an angle formed by the propagation direction of the light and the orientation of the LC molecules 231 is 60°, and reference numeral 350 denotes the intensity of the filtered light when an angle formed by the propagation direction of the light and the orientation of the LC molecules 231 is 90°.

Referring to FIG. 3, it is seen that the pass wavelength is tunable in a range of about 840-890 nm according to the angle formed by the propagation direction of the light and the orientation of the LC molecules 231. That is, as the angle formed by the propagation direction of the light and the orientation of the LC molecules 231 increases, the wavelength of the light filtered by the LC filter 200 is increased within the range from about 840 nm to about 890 nm.

The angle formed by the propagation direction of the light and the orientation of the LC molecules 231 may be adjusted according to the magnitude of the voltage applied to the LC layer 230.

Figure 4:
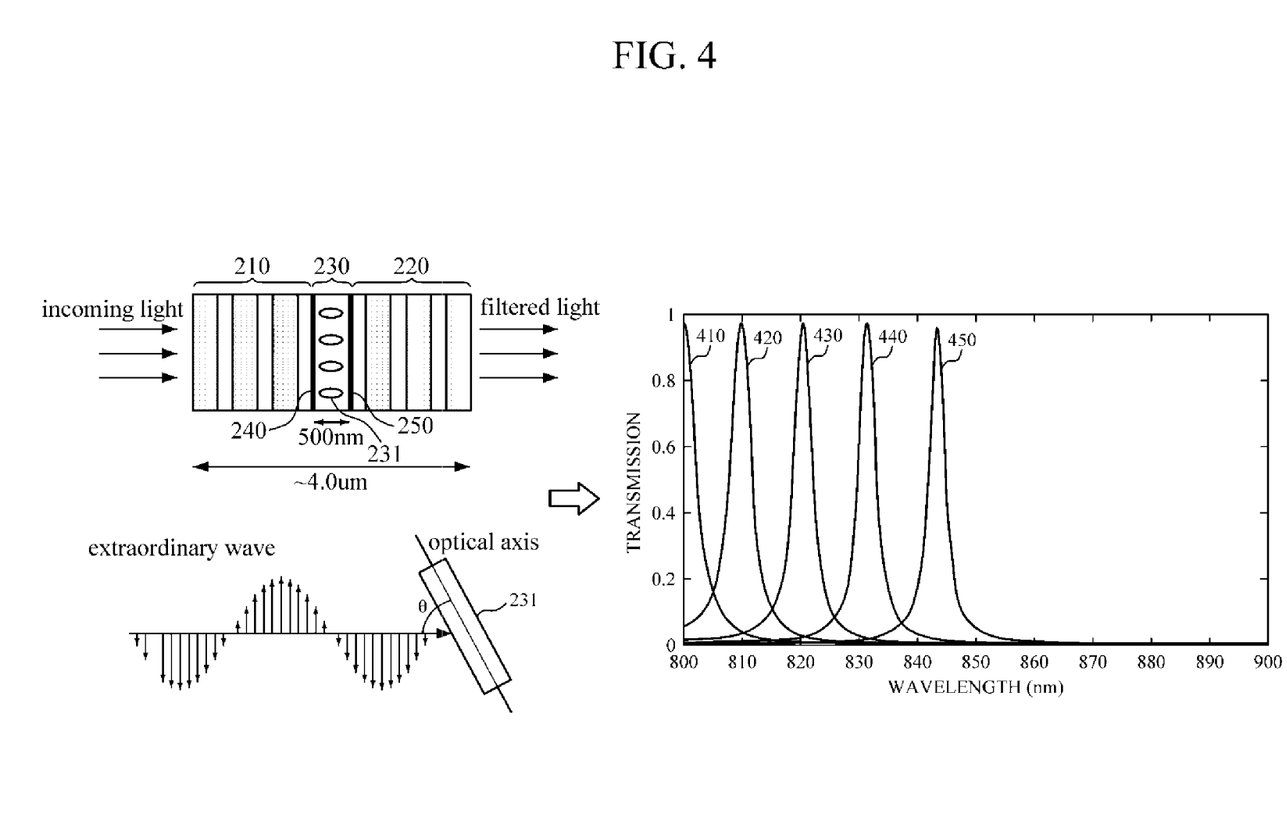
FIG. 4 is a diagram illustrating a pass wavelength being changed according to an electrical stimulus, according to an example embodiment.

FIG. 4 is a diagram illustrating a pass wavelength being changed according to an electrical stimulus, according to an example embodiment.

FIG. 4 shows the intensity of the light filtered by an LC filter 200 according to an angle formed by the propagation direction of the light and the orientation of LC molecules 231 in a case in which a first dielectric mirror and a second dielectric mirror each have a 6-layer laminated structured in which one layer formed of SiN and another layer formed of $SiO_2$ are repeatedly stacked on each other, the thickness of an LC layer is 500 nm, and the LC filter has a thickness of 4.0 μm. More specifically, reference numeral 410 denotes the intensity of the filtered light when an angle formed by the propagation direction of the light and the orientation of the LC molecules 231 is 0°, reference numeral 420 denotes the intensity of the filtered light when an angle formed by the propagation direction of the light and the orientation of the LC molecules 231 is 30°, reference numeral 430 denotes the intensity of the filtered light when an angle formed by the propagation direction of the light and the orientation of the LC molecules 231 is 45°, reference numeral 440 denotes the intensity of the filtered light when an angle formed by the propagation direction of the light and the orientation of the LC molecules 231 is 60°, and reference numeral 450 denotes the intensity of the filtered light when an angle formed by the propagation direction of the light and the orientation of the LC molecules 231 is 90°.

Referring to FIG. 4, it is seen that the pass wavelength is tunable in a range of about 800-850 nm according to the angle formed by the propagation direction of the light and the orientation of the LC molecules 231. That is, as the angle formed by the propagation direction of the light and the orientation of the LC molecules 231 increases, the wavelength of the light filtered by the LC filter 200 is increased within the range from about 800 nm to about 850 nm.

The angle formed by the propagation direction of the light and the orientation of the LC molecules 231 may be adjusted according to the magnitude of the voltage applied to the LC layer 230.

In addition, when FIG. 3 and FIG. 4 are compared with each other, it is seen that the range of the pass wavelength is changed by altering the thickness of the LC filter. That is, in the case of FIG. 4, the pass wavelength changes within a lower range than the case of FIG. 3.

Figure 5:
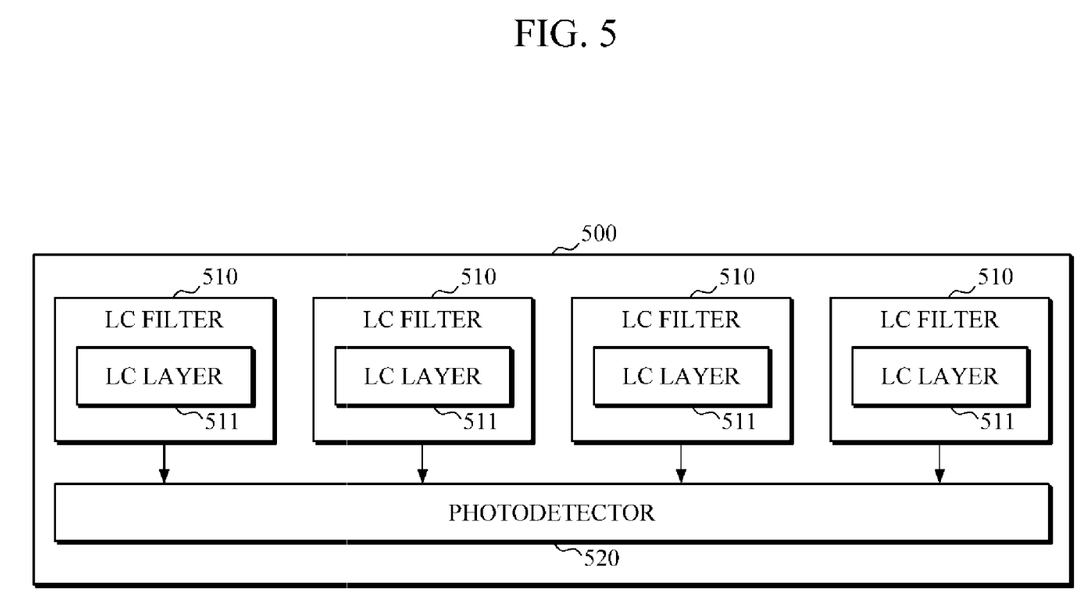
FIG. 5 is a block diagram a spectrometer according to another example embodiment.
Figure 6:
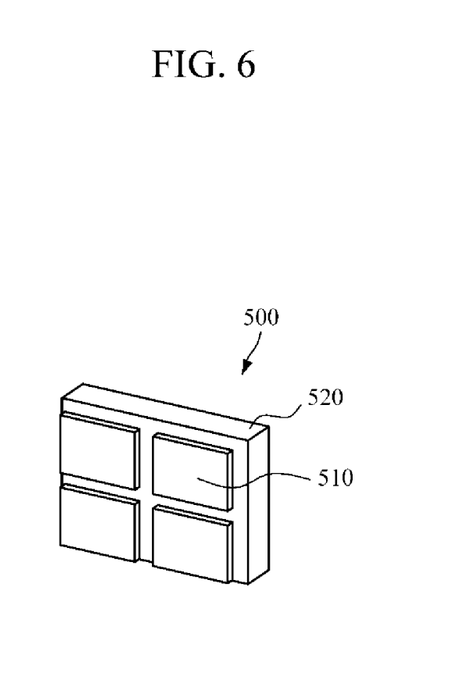
FIG. 6 is a diagram illustrating an implementation of the spectrometer of FIG. 5, according to an example embodiment.

FIG. 5 is a block diagram illustrating a spectrometer 500 according to another example embodiment, and FIG. 6 is a diagram illustrating an implementation of the spectrometer 500 of FIG. 5, according to an example embodiment.

Referring to FIGS. 5 and 6, the spectrometer 500 includes a plurality of LC filters 510 and a photodetector 520. Each of the LC filters includes an LC layer 511.

The plurality of LC filters 510 may have different thicknesses. As described above with reference to FIGS. 3 and 4, a range of a pass wavelength may be changed according to the thickness of the LC filter 510. Thus, the spectrometer 500 that includes a plurality of LC filters 510 having different thicknesses may cover a wider range of spectrum when compared with the case in which only a single LC filter 510 is included.

In addition, each LC filter 510 and the photodetector 520 are the same as those described with reference to FIGS. 1 and 2, and thus the detailed descriptions thereof will be omitted.

FIGS. 5 and 6 illustrate a case in which four LC filters 510 are included, but this is an example embodiment. Thus, the spectrometer 500 may include various numbers of LC filters 510 according to the performance and purpose of a system.

Figure 7:
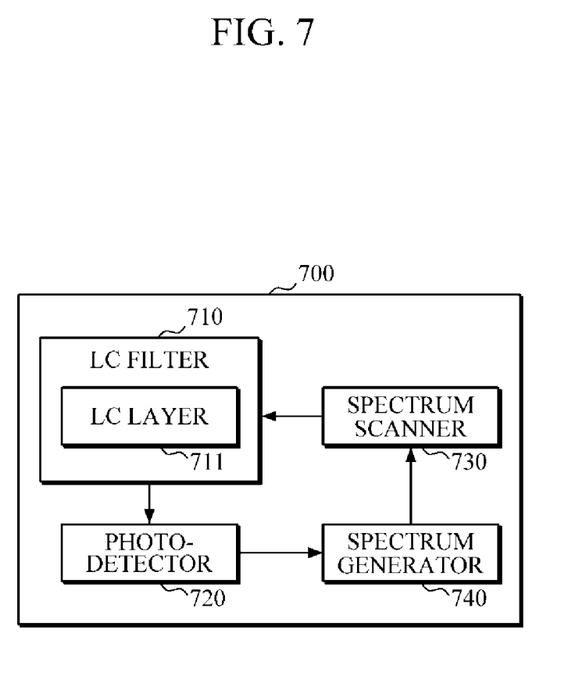
FIG. 7 is a block diagram illustrating a spectrometer according to still another example embodiment.

FIG. 7 is a block diagram illustrating a spectrometer 700 according to still another example embodiment.

Referring to FIG. 7, the spectrometer 700 includes an LC filter 710 including an LC layer 711, a photodetector 720, a spectrum scanner 730, and a spectrum generator 740. In this case, the LC filter 710 and the photodetector 720 are the same as those described with reference to FIG. 1, and hence the detailed descriptions thereof will be omitted.

The spectrum scanner 730 may apply an electrical stimulus to the LC layer 711 to detect light of various wavelengths and measure the intensity of light of various wavelengths. Because the pass wavelength of the LC filter 710, i.e., the pass wavelength of the LC layer 711 is tunable according to the electrical stimulus, the spectrum scanner 730 may tune the pass wavelength of the LC filter 710 by adjusting the voltage applied to the LC layer 711.

The spectrum generator 740 may measure the intensity of light of each wavelength on the basis of the light detected by the photodetector 720, and generate a spectrum by converting the measured light intensity into spectrum data.

Figure 8:
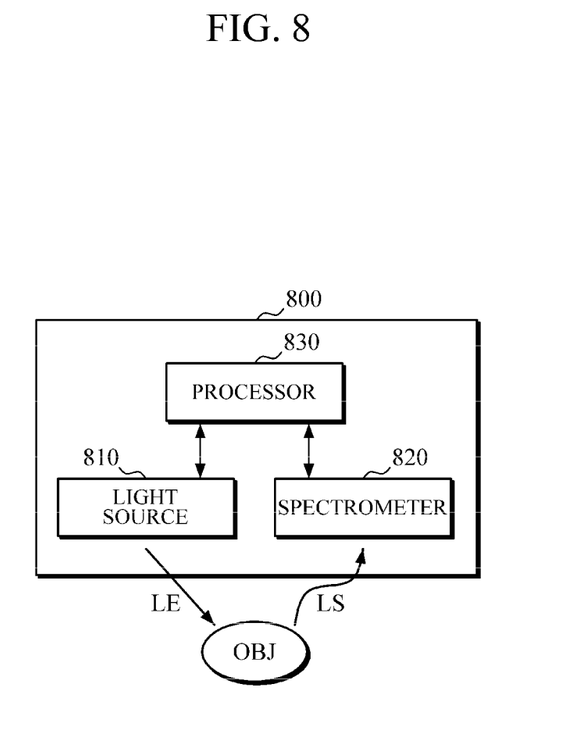
FIG. 8 is a block diagram illustrating a spectrometer module according to an example embodiment.

FIG. 8 is a block diagram illustrating a spectrometer module 800 according to an example embodiment.

Referring to FIG. 8, the spectrometer module 800 includes a light source 810, a spectrometer 820, and a processor 830.

The light source 810 emits light LE to an object OBJ. To this end, the light source 810 may include a light source and at least one optical element that allows light emitted from the light source to be directed toward a desired position of the object OBJ. The light source may be configured to emit light of an appropriate wavelength according to properties of the object to be analyzed. For example, the light source may emit light of near infrared (NIR) bands, e.g., NIR light of wavelength bands about 800 nm to 2500 nm. According to an example embodiment, the light source may be implemented as a light emission device or a laser light source.

The spectrometer 820 receives light scattered LS from the irradiated object OBJ and measure a spectrum. For example, the spectrometer 820 may be the spectrometer described with reference to FIGS. 1 to 7.

The processor 830 may analyze the physical properties of the object OBJ on the basis of the spectrum measured by the spectrometer 820. For example, the processor 830 may analyze the physical properties of the object OBJ, using NIR absorption spectroscopy or Raman spectroscopy.

The NIR absorption spectroscopy is a method of analyzing light that is emitted out of the skin through diffused reflection after irradiating broadband NIR rays on the skin of the object OBJC to calculate the intensity of light absorbed by blood sugar molecules in the skin and to predict a blood sugar level. The Raman spectroscopy is a method of analyzing a blood sugar level by obtaining a Raman shift via an analysis on wavelengths of light emitted from the object OBJ after irradiating a laser beam on the object OBJ. The Raman spectroscopy uses scattering, specifically inelastic scattering, such that light incident into the object OBJ collides with atoms and/or molecules contained in the object OBJ and is thusly scattered in various directions. The scattering does not indicate a reflection from the surfaces of atoms and/or molecules, but indicates emission after being absorbed into atoms and/or molecules, and thus scattered light has a wavelength that is longer than that of incident light. This wavelength difference may be less than or equal to about 200 nm. By analyzing a spectrum of the scattered light, any of various physical properties of the object OBJ, such as vibration of a molecule, a structure of the molecule, and the like, may be analyzed.

The spectrometer 820 and the processor 830 may be connected to each other in a wired or wireless manner. For example, the spectrometer module 800 may be implemented by a small-sized portable device in which the spectrometer 820 and the processor 830 are connected in a wired manner. Alternately, the processor 830 may be included in a mobile terminal and communicate with the spectrometer 820 in a wireless manner.

Figure 9:
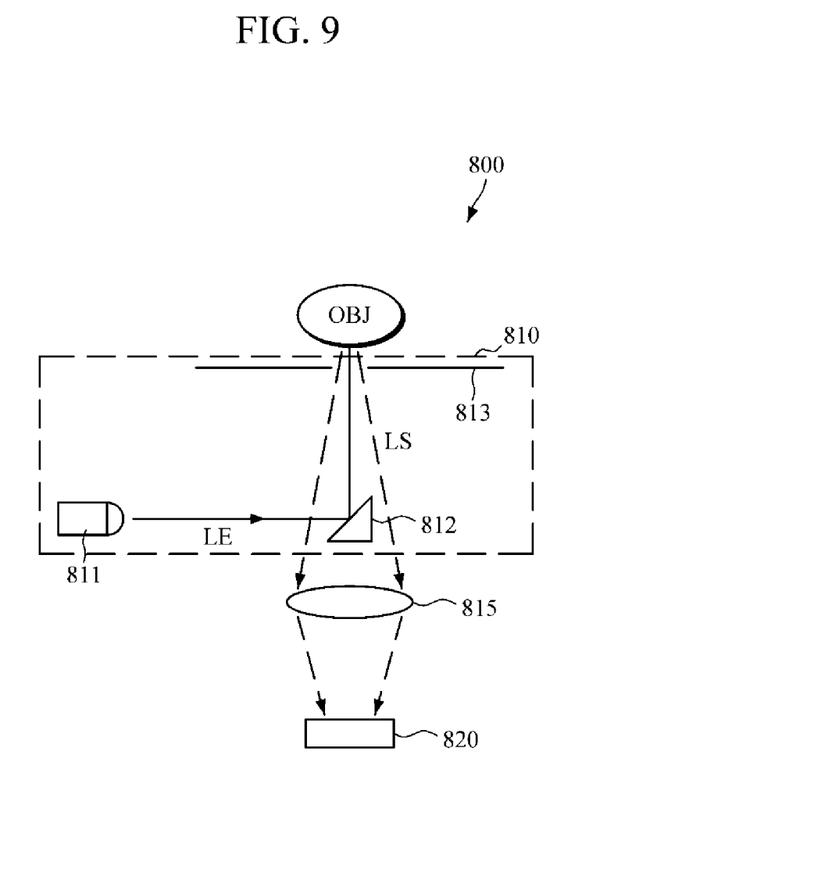
FIG. 9 is a diagram illustrating an optical arrangement of the spectrometer module of FIG. 8, according to an example embodiment.

FIG. 9 is a diagram illustrating an optical arrangement of the spectrometer module 800 of FIG. 8, according to an example embodiment.

Referring to FIG. 9, the spectrometer module 800 may be of a reflective type, and may include an optical system that is configured so that the spectrometer 820 senses scattered light LS reflected from the object OBJ. In the illustrated example embodiment, the spectrometer module 800 further includes a light collector 815 that collects the scattered light LS from the object OBJ into the spectrometer 820, but the light collector 815 may be omitted according to an example embodiment.

The light source 810 includes a light source 811, an optical path changer 812, and an aperture 813. Although the optical path changer 812 is shown in a prism form, this is only illustrative, and the optical path changer 812 may have an alternative form, such as, for example, a form of a beam splitter or a flat mirror. The optical path changer 812 may be omitted according to a disposed position of the light source 811.

The light LE irradiated from the light source 811 collides with a molecular structure contained in the object OBJ, is absorbed by the molecular structure, and is re-emitted from the object OBJ in the form of the wavelength-shifted scattered light LS. The scattered light LS, i.e., a biometric optical signal, includes various spectra for which degrees of wavelength shift vary according to a corresponding molecular state inside the object OBJ. The spectrometer module 800 employs an optical system structure in which the scattered light LS that propagates along the same path as the path of the light LE incident to the object OBJ is incident to the spectrometer 820, and according to circumstances, an additional optical device configured to divide and redirect the scattered light LS towards the spectrometer 820 may be further employed.

Figure 10:
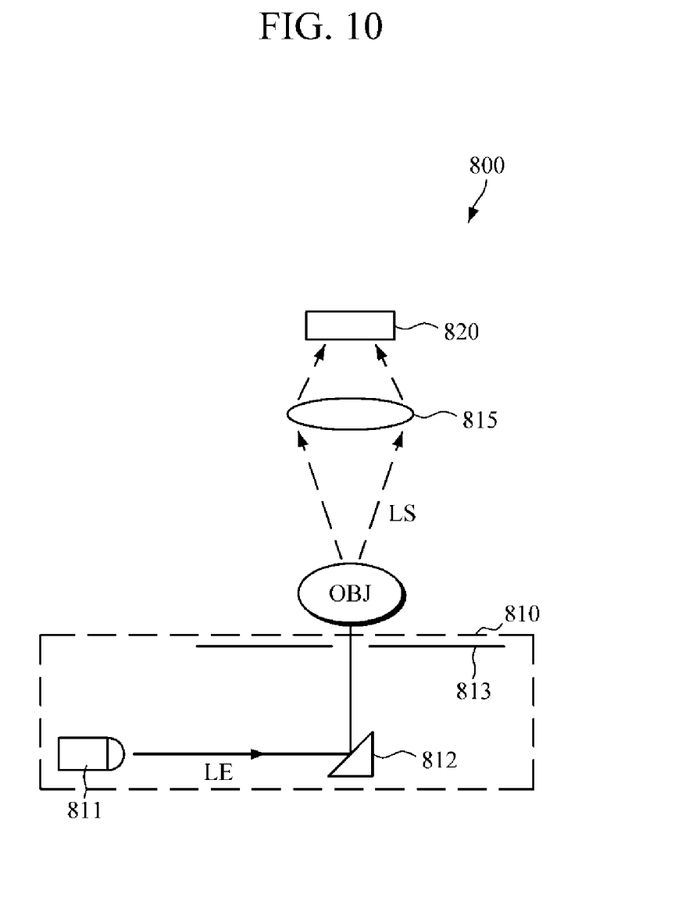
FIG. 10 is a diagram illustrating an optical arrangement of the spectrometer module of FIG. 8, according to another example embodiment.

FIG. 10 is a diagram illustrating another embodiment of an optical arrangement of the spectrometer module 800 of FIG. 8.

Referring to FIG. 10, the spectrometer module 800 is of a transmissive type and may include an optical system that is configured so that the spectrometer 820 senses the scattered light LS, which has propagated through the object OBJ. Although in the illustrated example, the spectrometer module 800 further includes a light collector 815 that collects the scattered light LS into the spectrometer 820, the light collector 815 may be omitted according to an example embodiment.

The light source 810 may include a light source 811, an optical path changer 812, and an aperture 813. Although the optical path changer 812 is shown in the prism form, this is illustrative, and the optical path changer 812 may have an alternative form, such as, for example, a form of a beam splitter or a flat mirror. The optical path changer 812 may be omitted according to a disposed position of the light source 811.

The light LE irradiated from the light source 811 collides with a molecular structure contained in the object OBJ, is absorbed by the molecular structure, and re-emitted from the object OBJ in the form of the wavelength-changed scattered light LS. The scattered light LS, i.e., a biometric optical signal, includes various spectra for which degrees of wavelength conversion vary according to a corresponding molecular state inside the object OBJ. The spectrometer module 800 employs an optical system structure in which the scattered light LS that has passed through the object OBJ is incident to the spectrometer 820.

The current example embodiments can be implemented as computer readable codes in a computer readable record medium. Codes and code segments constituting the computer program can be easily inferred by a skilled computer programmer in the art. The computer readable record medium includes all types of record media in which computer readable data are stored. Examples of the computer readable record medium include a ROM, a RAM, a CD-ROM, a magnetic tape, a floppy disk, and an optical data storage. Further, the record medium may be implemented in the form of a carrier wave such as Internet transmission. In addition, the computer readable record medium may be distributed to computer systems over a network, in which computer readable codes may be stored and executed in a distributed manner.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A spectrometer comprising:
  a liquid crystal (LC) filter comprising:
    an LC layer configured to pass light having a wavelength that is tunable based on an electrical stimulus that is applied to the LC layer; and
  a first dielectric mirror and a second dielectric mirror,
    wherein the LC layer is interposed between the first dielectric mirror and the second dielectric mirror,
    the first dielectric mirror has a first laminated structure in which a first inorganic layer of SiN or $TiO_2$ and a second inorganic layer of $SiO_2$ are alternately stacked on each other, and
    the second dielectric mirror has a second laminated structure in which a third inorganic layer of SiN or $TiO_2$ and a fourth inorganic layer of $SiO_2$ are alternately stacked on each other;
  a photodetector configured to detect the light passed through the LC filter;
  a spectrum scanner configured to apply the electrical stimulus to the LC layer; and
  a spectrum generator configured to:
    measure intensities of the detected light of different wavelengths; and
    generate a spectrum, based on the measured intensities of the detected light.

2. The spectrometer of claim 1, wherein the LC filter further comprises a first electrode and a second electrode,
  the first electrode is interposed between the first dielectric mirror and the LC layer, and
  the second electrode is interposed between the LC layer and the second dielectric mirror.

3. The spectrometer of claim 1, wherein the first dielectric mirror and the second dielectric mirror have different thicknesses.

4. A spectrometer comprising:
  liquid crystal (LC) filters, each of the LC filters comprising:
    an LC layer configured to pass light having a wavelength that is tunable based on an electrical stimulus that is applied to the LC layer; and
  a first dielectric mirror and a second dielectric mirror,
    wherein the LC layer is interposed between the first dielectric mirror and the second dielectric mirror,
    the first dielectric mirror has a first laminated structure in which a first inorganic layer of SiN or $TiO_2$ and a second inorganic layer of $SiO_2$ are alternately stacked on each other, and
    the second dielectric mirror has a second laminated structure in which a third inorganic layer of SiN or $TiO_2$ and a fourth inorganic layer of $SiO_2$ are alternately stacked on each other;
  a photodetector configured to detect the light passed through the LC filters;
  a spectrum scanner configured to apply the electrical stimulus to the LC layer; and
  a spectrum generator configured to:
    measure intensities of the detected light of different wavelengths; and
    generate a spectrum, based on the measured intensities of the detected light.

5. The spectrometer of claim 4, wherein the LC filters have different thicknesses.

6. A spectrometer module comprising:
  a light source configured to irradiate light onto an object;
  a spectrometer configured to receive scattered light from the object onto which the light is irradiated, and measure a spectrum, based on the received scattered light; and
  a processor configured to analyze physical properties of the object, based on the measured spectrum,
  wherein the spectrometer comprises:
    a liquid crystal (LC) filter comprising:
      an LC layer configured to pass light having a wavelength that is tunable based on an electrical stimulus that is applied to the LC layer; and
      a first dielectric mirror and a second dielectric mirror,
        wherein the LC layer is interposed between the first dielectric mirror and the second dielectric mirror,
        the first dielectric mirror has a first laminated structure in which a first inorganic layer of SiN or $TiO_2$ and a second inorganic layer of $SiO_2$ are alternately stacked on each other; and
        the second dielectric mirror has a second laminated structure in which a third inorganic layer SiN or $TiO_2$ and a fourth inorganic layer of $SiO_2$ are alternately stacked on each other; and
    a photodetector configured to detect the light passed through the LC filter.

7. The spectrometer module of claim 6, wherein the LC filter further comprises a first electrode and a second electrode,
  the first electrode is interposed between the first dielectric mirror and the LC layer, and
  the second electrode is interposed between the LC layer and the second dielectric mirror.

8. The spectrometer module of claim 6, wherein the processor is further configured to analyze the physical properties of the object, using near-infrared (NIR) absorption spectroscopy or Raman spectroscopy.

9. The spectrometer module of claim 6, wherein the spectrometer is further configured to receive the scattered light that is reflected from the object onto which the light is irradiated.

10. The spectrometer module of claim 6, wherein the spectrometer is further configured to receive the scattered light that is transmitted through the object onto which the light is irradiated.

* * * * *